United States Patent [19]

Clements

[11] Patent Number: 5,730,766
[45] Date of Patent: Mar. 24, 1998

[54] NON-ROUND UNITARY FILTER CARTRIDGE

[75] Inventor: Jack T. Clements, Lee's Summit, Mo.

[73] Assignee: BHA Group, Inc., Kansas City, Mo.

[21] Appl. No.: 743,312

[22] Filed: Nov. 5, 1996

[51] Int. Cl.⁶ .......................... B01D 29/21; B01D 46/02
[52] U.S. Cl. .................... 55/341.1; 55/377; 55/379; 55/502; 55/507; 55/509; 55/521
[58] Field of Search .................. 55/379, 497, 500, 55/521, 341.1, 341.7, 374–378, 499, 502, 507, 509, 513

[56] References Cited

U.S. PATENT DOCUMENTS

| | | |
|---|---|---|
| 1,012,122 | 12/1911 | Budil . |
| 1,743,934 | 1/1930 | Ruemelin ................ 55/341.1 X |
| 1,847,368 | 5/1932 | Wendler . |
| 2,072,906 | 3/1937 | Rosenberger .......... 55/341.1 X |
| 2,308,309 | 1/1943 | Ruemelin et al. . |
| 2,308,310 | 1/1943 | Ruemelin, Jr. et al. ........ 55/341.1 X |
| 2,335,315 | 11/1943 | Seymour . |
| 2,503,568 | 4/1950 | Timm . |
| 2,927,659 | 6/1960 | Pabst et al. . |
| 2,952,332 | 9/1960 | Metro ................ 55/341.2 X |
| 2,981,368 | 4/1961 | Johnson . |
| 3,167,415 | 1/1965 | Edwards ................ 55/302 |
| 3,170,777 | 2/1965 | Held .................. 55/341.3 X |
| 3,243,940 | 4/1966 | Larson ................ 55/341.1 X |
| 3,421,295 | 1/1969 | Swift et al. ................ 55/302 |
| 3,524,304 | 8/1970 | Wittemeier et al. ................ 55/374 |
| 3,550,359 | 12/1970 | Fisher et al. ................ 55/341 |
| 3,716,436 | 2/1973 | Pall et al. ............ 55/498 X |
| 3,747,605 | 7/1973 | O'Dell et al. ................ 55/341 |
| 3,765,152 | 10/1973 | Pausch ................ 55/302 X |
| 3,774,458 | 11/1973 | Kitai et al. ................ 74/2 |
| 3,774,769 | 11/1973 | Smith ................ 210/232 |
| 3,791,111 | 2/1974 | Kroll ................ 55/341 |
| 3,826,066 | 7/1974 | Higgins ................ 55/379 |
| 3,830,042 | 8/1974 | MacDonnell ........ 55/497 X |
| 3,837,151 | 9/1974 | Jensen ................ 55/341 |
| 3,853,509 | 12/1974 | Leliaert ................ 55/341 |
| 3,876,402 | 4/1975 | Bundy et al. ................ 55/341 |
| 3,912,962 | 10/1975 | Duyckinck ................ 55/302 |
| 3,997,305 | 12/1976 | Ulvestad et al. ................ 55/379 |
| 4,007,026 | 2/1977 | Groh ................ 55/341.1 X |
| 4,073,632 | 2/1978 | Reinauer et al. ................ 55/374 |

(List continued on next page.)

FOREIGN PATENT DOCUMENTS

| | | |
|---|---|---|
| 0160168 | 11/1985 | European Pat. Off. . |
| 0213930 | 3/1987 | European Pat. Off. . |
| 0520737 | 12/1992 | European Pat. Off. . |
| 48891 | 10/1889 | Germany . |

(List continued on next page.)

*Primary Examiner*—Robert Spitzer
*Attorney, Agent, or Firm*—Kokjer Kircher Bowman & Johnson

[57] ABSTRACT

A non-round unitary filter cartridge according to the present invention is provided having a unitary structure with pleated filter media formed securely about a perforated interior core. Opposite ends of the pleated filter media and perforated core are integrally formed with a bottom end cap and a flexible upper collar. The flexible upper collar is formed of a flexible molding compound which is deformable to pass through an opening in a tube sheet which retains the filter cartridge. The perforated core is oblong in configuration, having first and second parallel major side surfaces and first and second rounded outer ends. The flexible collar is elliptical in cross-section and has an outwardly facing groove located at the top of the barrel portion for sealably receiving a periphery of the tube sheet aperture. The dimensions of the elliptically shaped groove are slightly greater than the associated aperture in the tube sheet, which preferably has first and second parallel major sides and first and second rounded outer ends. The flexible upper collar is integrally molded and has an inner wall defining an opening, or port. The filter cartridge, and namely the flexible collar, is compression fit into the opening into the tube sheet, thereby effecting a dust tight seal.

20 Claims, 2 Drawing Sheets

U.S. PATENT DOCUMENTS

| | | | |
|---|---|---|---|
| 4,159,197 | 6/1979 | Schuler et al. | 55/507 X |
| 4,187,091 | 2/1980 | Durre et al. | 55/499 |
| 4,218,227 | 8/1980 | Frey | 55/302 |
| 4,219,343 | 8/1980 | Peterson | 55/341.3 X |
| 4,247,314 | 1/1981 | Smoluchowski et al. | 55/304 |
| 4,256,473 | 3/1981 | De Martino | 55/379 |
| 4,270,935 | 6/1981 | Reinauer | 55/379 |
| 4,272,263 | 6/1981 | Hancock | 55/341.1 X |
| 4,276,069 | 6/1981 | Miller | 55/379 |
| 4,291,904 | 9/1981 | Iversen et al. | 285/162 |
| 4,292,057 | 9/1981 | Ulvestad et al. | 55/379 |
| 4,312,648 | 1/1982 | Day | 55/378 |
| 4,319,897 | 3/1982 | Labadie | 55/302 |
| 4,322,231 | 3/1982 | Hilzendeger et al. | 55/357 |
| 4,344,781 | 8/1982 | Higgins et al. | 55/379 |
| 4,424,070 | 1/1984 | Robinson | 55/378 |
| 4,436,536 | 3/1984 | Robinson | 55/341.1 |
| 4,443,237 | 4/1984 | Ulvestad | 55/379 |
| 4,445,915 | 5/1984 | Robinson | 55/379 |
| 4,560,477 | 12/1985 | Moldow | 210/457 |
| 4,632,680 | 12/1986 | Klimczak | 55/302 |
| 4,655,806 | 4/1987 | Bowersox | 55/341.2 |
| 4,663,041 | 5/1987 | Miyagi et al. | 210/493.2 |
| 4,732,678 | 3/1988 | Humbert, Jr. | 210/440 |
| 4,813,985 | 3/1989 | Brennecke et al. | 55/378 |
| 4,878,930 | 11/1989 | Manniso et al. | 55/493 |
| 4,929,354 | 5/1990 | Meyering et al. | 210/321.61 |
| 4,954,255 | 9/1990 | Müller et al. | 210/437 |
| 5,074,896 | 12/1991 | Baert et al. | 55/379 |
| 5,173,098 | 12/1992 | Pipkorn | 55/379 |
| 5,207,811 | 5/1993 | Buonpastore | 55/498 |
| 5,207,812 | 5/1993 | Tronto et al. | 55/498 |
| 5,211,846 | 5/1993 | Kott et al. | 210/232 |
| 5,222,488 | 6/1993 | Forsgren | 128/201.25 |
| 5,290,441 | 3/1994 | Griffin et al. | 55/379 |
| 5,290,446 | 3/1994 | Degen et al. | 210/489 |
| 5,308,369 | 5/1994 | Mortow et al. | 55/379 |
| 5,336,405 | 8/1994 | Tang et al. | 210/232 |
| 5,536,290 | 7/1996 | Stark et al. | 55/502 X |
| 5,632,791 | 5/1997 | Oussoren et al. | 55/502 X |

FOREIGN PATENT DOCUMENTS

| | | | |
|---|---|---|---|
| 1191078 | 4/1965 | Germany. | |
| 0242388 | 11/1925 | United Kingdom. | |
| 0636439 | 4/1950 | United Kingdom. | |
| 0840570 | 7/1960 | United Kingdom. | |
| 0990587 | 4/1965 | United Kingdom. | |
| 1016556 | 1/1966 | United Kingdom. | |
| 1081516 | 8/1967 | United Kingdom. | |
| 2195558 | 4/1988 | United Kingdom | 55/379 |
| WO85/05286 | 12/1985 | WIPO. | |

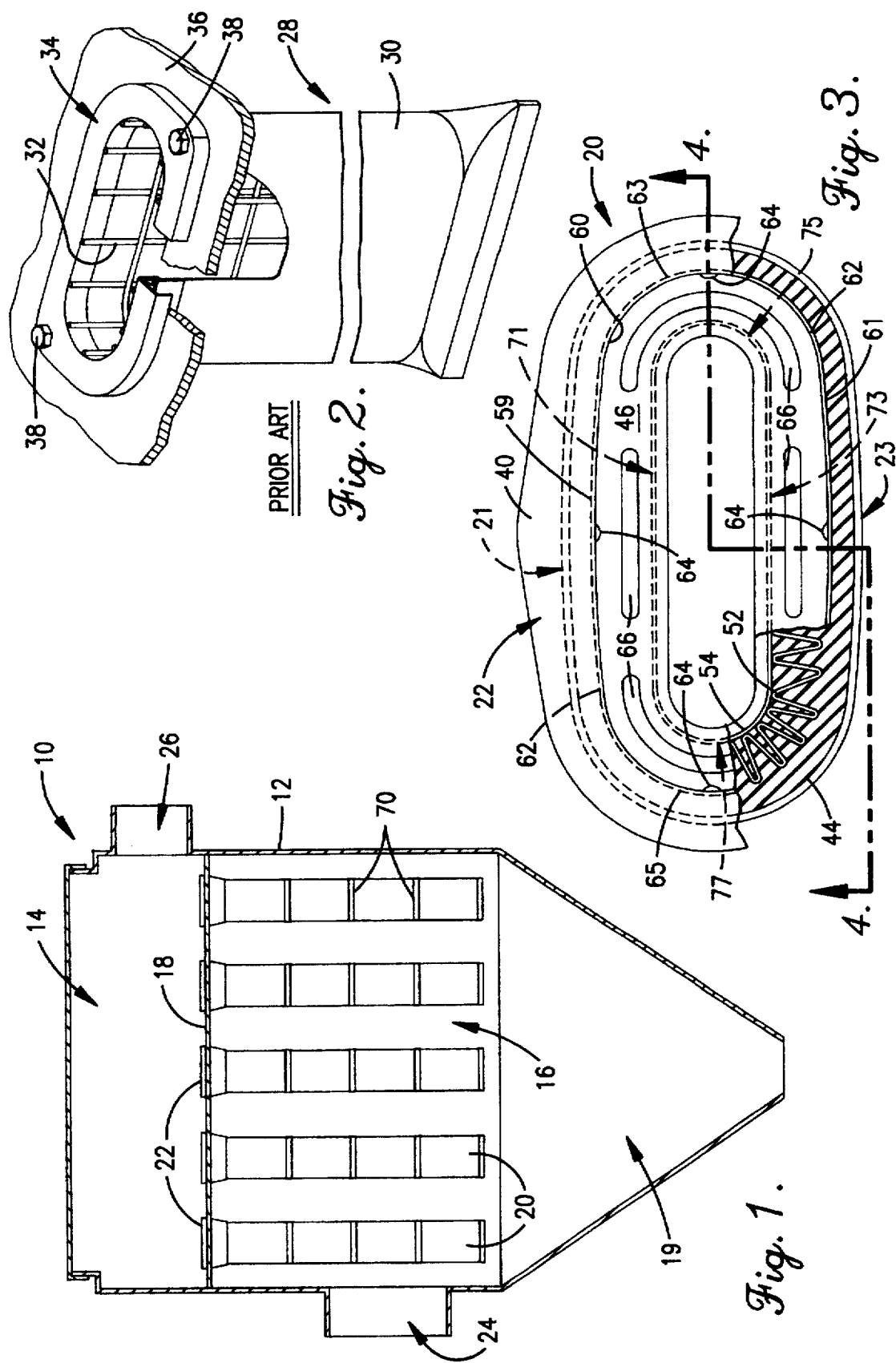

NON-ROUND UNITARY FILTER CARTRIDGE

BACKGROUND OF THE INVENTION

1. Field of the Invention

The present invention is directed to a filter device for a dust collector. Particularly, the present invention is directed to a filter cartridge for use in a dust collector, such as a baghouse.

2. Description of the Related Art

Baghouses, also known as dust collectors, for filtering particulate-laden air are well known. Conventional baghouses have a large housing with an upper, clean air chamber and a lower, dirty air chamber. The two chambers, commonly referred to as plenums, are separated by a sheet of metal, commonly referred to as a tube sheet or cell plate. The tube sheet has a number of openings therein from which cylindrical filters, such as bags or cartridges, are aligned. The filters suspend downwardly from the tube sheet openings into the dirty air chamber. Particulate-laden air is introduced into the dirty air chamber, and the particulates collect onto the filters. The filtered air passes through the filters to the interior of the filters, and upwardly out through the openings in the tube sheet into the clean air chamber. From the clean air chamber, the cleaned air is exhausted into the environment, or recirculated for other uses.

A principal objective in the design of a baghouse, and more particularly in the design of a filter bag or cartridge and its support structure, is that a seal exist between each filter element and the tube sheet. Otherwise, in the absence of a seal, particulate-laden air will seep around the filter element, through the tube sheet aperture, and into the clean air chamber, thereby contaminating the clean air. Additionally, because the filter elements require periodic replacement, it is important that the filter elements are easily removable and replaceable.

Numerous attempts have been made to develop a baghouse filter element and supporting structure for attaching a filter element to a baghouse tube sheet. In the past, most conventional filter elements had a bag placed about a cage. Such a filter element is shown in U.S. Pat. No. 4,292,057 (Ulvestad et al.).

More recently, filter cartridges having a pleated filter member placed about a perforated core have become increasingly popular. When compared against conventional bag-type filter elements, the pleats on a pleated cartridge filter provide increased surface area for collecting particulate. Thus, a dust collector utilizing pleated filter cartridges may accomplish, for example, twice the collection of a similar collector utilizing bag-type filters. U.S. Pat. Nos. 4,424,070 (Robinson), 4,436,536 (Robinson), 4,443,237 (Ulvestad), 4,445,915 (Robinson), 5,207,812 (Tronto et al.) 4,954,255 (Muller et al.), 5,222,488 (Forsgren), and 5,211,846 (Kott et al.) are representative examples of prior art filter elements of the pleated cartridge type.

Each filter element described in the foregoing patents is cylindrical in configuration. Specifically, taking a horizontal cross-section through any of the described filters when it is in a suspended or upright position yields a top plan view that is circular or round. While cylindrical filter elements of this type permit satisfactory filtering results to be achieved, their major drawback is that they leave significant space between adjacent filter elements.

In an effort to overcome this drawback of cylindrical filters, efforts have been made to develop a non-round filter element for dust collectors. In the past, however, these attempts have produced only non-round filter elements of the type utilizing a bag place about a cage. One example of such a prior art filter element is shown in FIG. 2. As shown, such a device has a fabric bag place about a metal cage. The bag and cage are suspended from a tube sheet opening by metallic support structure. In order to effect a dust-tight seal between the filter element and the tube sheet, a flexible gasket is conventionally placed between the support structure and the periphery of the tube sheet opening.

Another prior art example of a non-round filter element is disclosed in U.S. Pat. No. 5,074,896 (Baert et al.). The '896 patent teaches placing a pouch in the form of an elongate sleeve about a non-round interior frame in the form of a grid. In order to suspend the filter elements from an associated opening, a plate support element and sealing element, as described above, are required. As shown, framework in which the filter element rests includes cradles at a lower end for maintaining the filter elements in a parallel relationship with each other.

The prior art devices like those of U.S. Pat. No. 5,074,896, requiring the use of bags positioned about a cage, experience numerous drawbacks. For instance, the non-round prior art filter bag and cage assemblies require separately constructed support structure for attaching the filter elements to a baghouse tube sheet. Thus, overall assemblies tend to be complex, thereby adding to the cost of the filter element. Additionally, due to ineffective and inconsistent seals, prior art non-round filter elements have not been completely satisfactory in preventing particulate-laden air from seeping from the dirty air plenum, through the tube sheet opening, and into the clean air chamber. Furthermore, the installation and replacement of these type of filter elements within a baghouse tube sheet, including mounting and sealing, remains one of the most time-consuming and expensive fabrication operations in the manufacture of baghouses and in the replacement of filter elements.

Accordingly, the need exists for a filter element, and particularly a non-round filter element, that results in increased filtration area within a dust collector. The need also exists for a non-round filter element that provides a better seal than prior non-round filter elements and is easier to install and replace than prior non-round filter elements. The present invention fills these and other needs, and overcomes the drawbacks of the prior art.

SUMMARY OF THE INVENTION

It is the principal object of the present invention to increase the filtration efficiency of a dust collector.

It is also an object of the present invention to increase the overall filtration surface area within a dust collector.

It is an additional object of the present invention to optimize space within a dust collector for the purpose of filtering particulate laden air.

It is an additional object of the present invention to provide a non-round filter cartridge which reliably seals with the tube sheet of a dust collector.

It is an additional object of the present invention to provide a non-round filter cartridge which is easily installed and removed from a baghouse.

It is a further object of the present invention to provide a non-round filter cartridge utilizing pleated filter media.

A filter cartridge according to the present invention is provided having a unitary structure with a pleated filter media formed securely about an elongated, non-round perforated core (or screen). The core has first and second parallel sides, and first and second arcuate, or rounded, ends. Opposite ends of the filter media and interior core are integrally formed within a bottom end cap at and integral flexible upper collar, each of which is formed of a molding compound.

The integral flexible collar, formed from a molding compound, is secured to the tops of the perforated core and the pleated filter media. The flexible collar has a barrel extending downwardly beneath an upper rim of the collar. The collar includes a groove facing outwardly therefrom, proximate an upper end of the barrel. The barrel, including the grooved portion, has a non-round outer periphery that is preferably elliptical in configuration. The barrel is funnel shaped such that it tapers inwardly towards its lower end.

The upper collar has a lower lip extending along the interior of the inner core to securely engage the inner core. This lower lip is formed integrally with a radially extending ledge, which is positioned over and engages with the top of the core and filter media. The ledge is integrally formed with the barrel of the collar.

The collar has an upper opening defined by an inner wall. The inner wall forms a non-round configuration, with outer ends being rounded and major sides being outwardly bowed. A snap band engages the inner wall and applies a force radially outwardly into the inner wall. Specifically, the collar has an upper lip extending inwardly towards the opening, and the snap band is positioned just beneath the upper lip. The inner wall also has a plurality of spaced apart reinforcing ribs positioned beneath the snap band. The upper collar may be manually deformed to position it within an opening in a tube sheet, for retaining the filter cartridge. The non-round configuration of the inner wall, having no straight portions, prevents easy deflection of the snap band.

When installed, the unitary filter cartridge is placed downwardly through a non-round opening in a tube sheet so that the outer groove of the collar receives a peripheral edge of an associated tube sheet opening. In this position, the upper rim of the collar rests on the top of the tube sheet, while the majority of the downwardly extending barrel portion (e.g., that portion beneath the groove) extends into the dirty air chamber of the dust collector. The opening in the tube sheet preferably has parallel sides and outer arcuate, or rounded, ends. The unitary cartridge filter is dimensioned so as to fit downwardly within the opening. The barrel of the collar, however, is dimensioned so that it must be force-fit downwardly through the opening. The flexible collar compresses as the filter cartridge is compressed into the opening. Specifically, the side portions of the elliptically shaped barrel compress inwardly, thereby providing an outward biasing force against the periphery of the tube sheet opening when the filter cartridge is in place.

BRIEF DESCRIPTION OF THE DRAWINGS

The objects and features of the invention noted above are explained in more detail with reference to the drawings, in which like reference numerals denote like elements, and in which:

FIG. 1 is a diagrammatic view of a dust collector of the present invention;

FIG. 2 is a perspective view illustrating a prior art, non-round filter and its attachment structure;

FIG. 3 is a top plan view, with portions broken away, of a filter cartridge of the present invention;

DETAILED DESCRIPTION OF THE INVENTION

Figure 5:
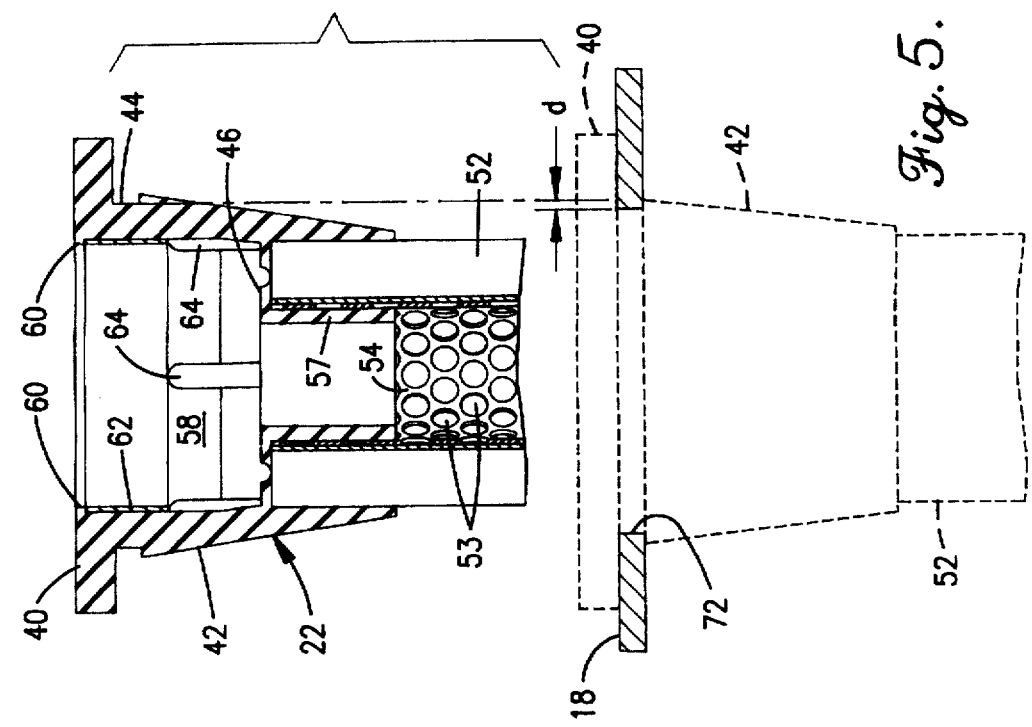
FIG. 5 is an end view, taken along line 5—5 of FIG. 4, illustrating installation of a filter cartridge of the present invention in a dust collector.

With reference initially to FIG. 1, a dust collector (also referred to as a baghouse) of the present invention is denoted generally by reference numeral 10. Dust collector 10 is formed generally of a housing 12 separated into upper and lower chambers 14, 16 respectively, by a tube sheet 18. The dust collector 10 has a dust collection hopper 19 at its bottom portion. A plurality of filter elements 20 are suspended from tube sheet 18 into the lower chamber 16, and are held in place by attachment structure, denoted generally by reference numeral 22 in FIG. 1. An inlet 24 communicates with lower chamber 16 and an outlet 26 communicates with upper chamber 14.

The structure and operation of baghouse 10 will be readily appreciated by those with skill in the art. Described briefly, particulate-laden air is introduced into lower chamber 16 through inlet 24. The particulates collect onto filter elements 20, and the cleaned air exits out through the interior of the filters, upwardly through apertures in the tube sheet, and into the clean air chamber 14 where it is exhausted through outlet 26.

With reference now to FIG. 2, a prior art non-round filter element, and its attachment structure for attaching the filter element in a baghouse, is denoted generally by reference numeral 28, and is shown and described.

Prior art non-round filter element 28 has a fabric filter bag 30 placed about a non-round, metallic cage 32. Attachment structure, denoted generally by reference numeral 34, suspends the filter 28 from the periphery of an opening in a tube sheet 36. As shown, fasteners 38 are used for fastening attachment structure 34 to tube sheet 36. As will be readily understood, and as described above, such prior art devices typically utilize a flexible snap band assembly to provide a seal between attachment structure 34 and the periphery of the tube sheet opening. The prior art device as illustrated in FIG. 2 has numerous drawbacks, including its complexity, its inability to effectively create a dust tight seal with the tube sheet, and its minimal surface area available for filtration in spite of the overall space the filter occupies.

Figure 4:
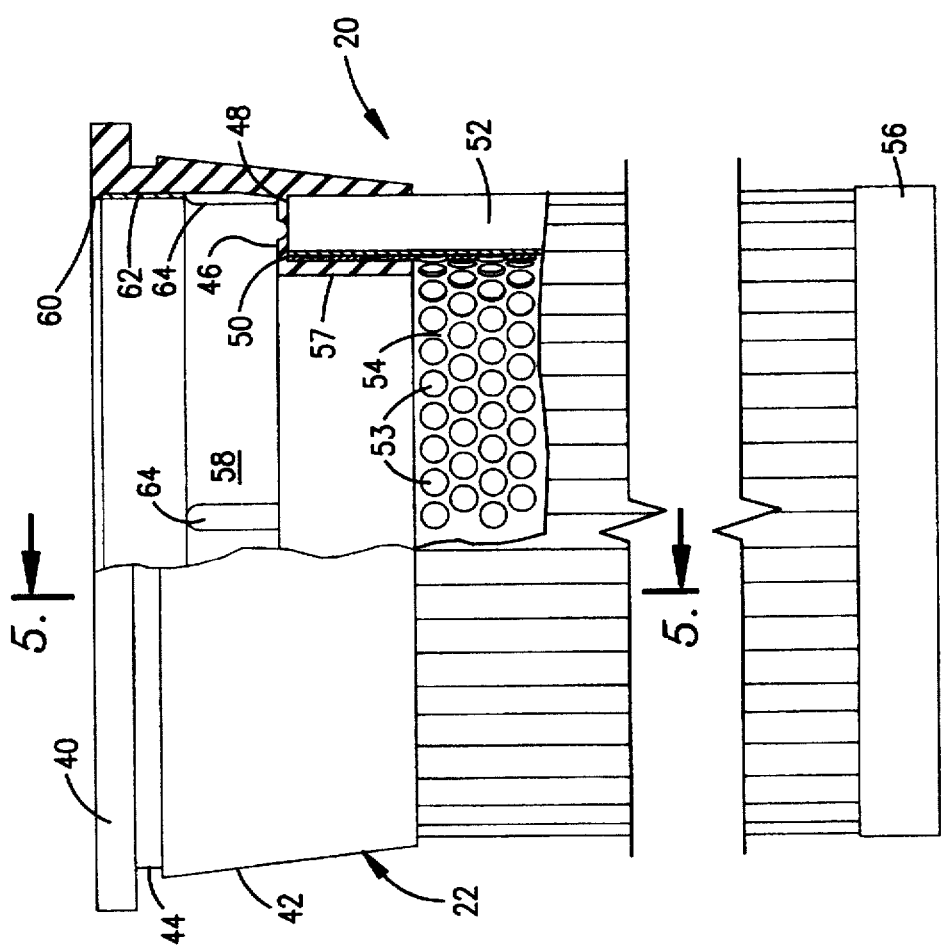
FIG. 4 is a front elevational view, taken along line 4—4 of FIG. 3, of the filter cartridge of the present invention.

With reference now to FIGS. 3–5, a unitary non-round filter cartridge of the present invention, designated generally by reference numeral 20, is shown and described.

With specific reference to FIGS. 3 and 4, a non-round unitary filter cartridge of the present invention is denoted generally by reference numeral 20. The unitary non-round filter cartridge 20 has a flexible collar 22 at its upper end. Flexible collar 22 is integrally molded from a molding compound, such as an epoxy, ceramic, silicone, or urethane composition. Preferably, when completely cured, the collar has a durometer reading within the range of 60–70. The flexible collar 22 is formed to have an upper rim 40 extending entirely about the periphery of collar 22. A barrel portion, denoted generally by reference numeral 42, extends downwardly from upper rim 40, as shown. An outer groove 44 is positioned at the upper end of barrel 42, just beneath upper rim 40.

A ledge 46 extends inwardly from barrel portion 42 about the periphery of collar 22. The lower surface of ledge 46 engages with tops 48, 50, respectively, of pleated filter media 52 and a perforated core 54. The ledge 46 is formed integrally with barrel 42. A lip 57 extends downwardly from an inner most edge of ledge 46 and engages an upper, inner surface of perforated core 54, as shown. As will be readily understood, potting the combination of perforated filter media 52, wrapped about perforated core 54, into the potting compound secures the combination of filter media 52 and perforated core 54 to the collar 22.

Collar 22 represents an encasement which defines a discharge port from the lower, filtering chamber 16 through an associated opening in the tube sheet 18. Specifically, collar 22 has an opening, extending downwardly through an interior portion of the collar, defined generally by an inner wall 58. Inner wall 58 has an inwardly protruding, upper lip 60. Flexible collar 22 preferably includes a snap band 62 extending about the periphery of collar 22 in engagement with inner wall 58 at a location just beneath, and preferably in engagement with, upper lip 60, although it should be understood that an effective dust tight seal can be accomplished without the snap band 62. Thus, if desired, the snap band 62 may be excluded. Snap band 62 is preferably formed of metal, but could be formed of any suitable material. Snap band 62 provides a radially outward, biasing force into inner wall 58, generally in the proximity of outer groove 44. Inner wall 58 also has a plurality of spaced apart reinforcing ribs 64 extending upwardly from ledge 46 and terminating at a location beneath snap band 62. Additionally, ledge 46 has a plurality of indentations 66, as shown.

In accordance with an important aspect of the present invention, collar 22 is non-round. Particularly, inner wall 58 of collar 22 is formed in a non-round configuration having outwardly rounded ends 63, 65 and outwardly bowed major side portions 59, 61. Such a configuration prevents easy deflection of snap band 62.

Pleated filter media 52 is a pleat pack formed of any suitable material. For instance, pleated filter media 52 may be constructed of polyester, polypropylene, Aramid fibers, such as Nomex™, PPS fibers, such as Ryton™, fiberglass, acrylic fibers or other suitable materials.

Non-round unitary filter cartridge 20 also has a bottom end cap, denoted generally by reference numeral 56, formed of a molding compound. Preferably, the bottom end cap 56 is formed of the same material as the collar 22, but could be formed of a different material. As will be appreciated, lower ends of pleated filter media 52 and the perforated core 54 are potted into the potting compound, such that the cured compound forms an end cap 56 which securely engages the bottom ends of the filter media 52 and core 54.

Perforated core 54 is preferably formed of metal, but could be any suitable material, such as plastic or another material. It will be understood and appreciated that perforated core 54 could be in the form of a screen or cage, so long as it sufficiently supports filter media 52 positioned about it.

In accordance with a principal aspect of the present invention, perforated core 54 is an elongate, non-round tube. Specifically, perforated core 54 is non-cylindrical. A horizontal cross-section taken through the elongated perforated core 54, when it is in a suspended or upright position, reveals a non-round configuration. Preferably, the perforated core 54 is oblong in cross-section, in that it deviates from a circular form through elongation. As shown in FIG. 3 perforated core 54 preferably has first and second parallel side portions 71, 73 and rounded, or arcuate, outer ends 75, 77. As a result, when filter media 52 is positioned about perforated core 54, cartridge filter 20 similarly has first and second major sides that are parallel to each other, and first and second outer ends formed in an outwardly rounded configuration.

Construction of the present invention will now be readily understood in view of the foregoing. Specifically, the oblong or non-round, elongated perforated core is bent or rolled into its preferred configuration. Filter media 52 is positioned about core 54, and the combination thereof is potted into non-cured molding compound in molds for the desired configuration of upper collar 22 and bottom end cap 56. Once cured, snap band 62 can be inserted into place in flexible collar 22 and one or more support bands 70 (FIG. 1) may be positioned about filter media 52.

With reference to FIG. 5, installation of filter cartridge 20 is achieved by placing it within an opening, defined by a periphery 72, in a tube sheet 18 located within dust collector 10. As shown in FIG. 5, the dimensions of the outer periphery of filter media 52, when wrapped around perforated core 54, are such that the filter media fits within the opening of tube sheet 18 defined by periphery 72. To install the filter cartridge 20, the filter cartridge is aligned with the opening in the tube sheet 18, and moved downwardly through the opening until the filter cartridge is in the position shown by dash lines in FIG. 5. In accordance with a principal aspect of the present invention, dimensions of the outer periphery of the collar portion at the location of the outer groove 44, in a state when the flexible collar 22 is not compressed, is slightly larger than the periphery of the tube sheet opening into which the filter cartridge 20 is to be inserted. This is illustrated by the dimension designated by referenced in FIG. 5. Thus, as will be readily appreciated, major, elliptical outer edges 21, 23 of the flexible collar 22, at the location of the outer groove 44, are compression fit into the tube sheet opening, defined by periphery 72, thereby effecting a dust type seal. Thus, the elliptical outer periphery of the barrel portion 42 of the flexible collar 22 requires it to compress to pass through the opening, defined by periphery 72 in the tube sheet 18. Accordingly, filter cartridge 20 is force fit into the opening in tube sheet 18, until the outer groove 44 of the flexible collar 22 receive peripheral edge 72 of the opening in the tube sheet 18. In addition to the outward bias applied by the resilient memory of the flexible collar 22, the snap band 62 provides an additional outward biasing force to further effectuate the seal with tube sheet 18.

During operation of dust collector 10, filter cartridges 20 filter particulate-laden air such that the particulates deposit on the filtering media 52. The cleaned air passes through the perforations 53 of the core 54 to the interior of core 54, where it is drawn upwardly out through the tube sheet apertures 71 and into the clean air chamber 14. During this operation, the present invention, and namely the seal formed by flexible collar 22, prevents particulate-laden air from seeping between collar 22 and tube sheet 18.

The present invention is highly useful for providing an effective dust-tight seal between a filter and baghouse tube sheet. The present invention is also easy to manufacture, install, and replace, and substantially maximizes the filtration surface within a dust collector.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense. For instance, the terms "top" and "bottom" as used herein should be construed to encompass first and second outer ends. For example, the filter cartridge of the present invention may be employed in a dust collector in a horizontal fashion. In such a case, the "top" of the filter cartridge, when in a vertical orientation, is the end that engages the tube sheet when the filter cartridge is in a horizontal position. Similarly, terms such as "under", "above", "below" and "beneath" should be construed as relative terms, and in no way as limiting the invention to a vertical orientation.

What is claimed is:

1. A filter cartridge comprising:
 a non-round, elongate perforated core member having a first outer end;
 pleated filter media positioned about said core member, said pleated filter media having a first outer end;
 a non-round flexible collar formed of molding compound and fixedly secured to said first outer ends of said core member and said pleated filter media.

2. The filter cartridge as set forth in claim 1, said core member having first and second parallel sides, and first and second arcuate ends.

3. The filter cartridge as set forth in claim 1, said collar having a rim and a barrel, said barrel extending from said rim and including a groove facing outwardly from said gasket, said groove being proximate a first end of said barrel.

4. The filter cartridge as set forth in claim 3, said barrel having an elliptical outer periphery.

5. The filter cartridge as set forth in claim 4, wherein said barrel tapers inwardly towards a second end thereof.

6. The filter cartridge as set forth in claim 3, wherein said collar has a ledge extending inwardly from, and formed integrally with, said barrel, wherein said ledge engages said first ends of said core member and said pleated filter media.

7. The filter cartridge as set forth in claim 6 further comprising a lip extending downwardly from an innermost end of said ledge, said lip formed integrally with said ledge and engaging a portion of an inner surface of said core member.

8. The filter cartridge as set forth in claim 1, said collar having an opening, defined by an inner wall, wherein a snap band engages said inner wall and applies a force radially outwardly into said inner wall.

9. The filter cartridge as set forth in claim 8, said inner wall having an upper lip, wherein said snap band is positioned beneath said upper lip.

10. The filter cartridge as set forth in claim 9, wherein said inner wall has a plurality of spaced apart reinforcing ribs positioned beneath said snap band.

11. The filter cartridge as set forth in claim 8, wherein said inner wall has first and second outwardly bowed major portions.

12. The filter cartridge of claim 1, wherein said core member has an outer periphery that is oblong in configuration.

13. The filter cartridge as set forth in claim 1 further comprising a bottom secured to a second end of said filter media and a second end of said core member.

14. A dust collector, for collecting particulate laden in air, comprising:
 a first chamber and a second chamber separated by a metallic sheet having a plurality of non-round apertures therein;
 a plurality of filters suspended from said metallic sheet, into said second chamber, each said filter being aligned with one of said non-round apertures, wherein each said filter comprises:
  a non-round, elongate perforated core member having a top;
  pleated filter media positioned about said core member, said pleated filter media having a top;
  a non-round, molded flexible collar fixedly secured to said tops of said core member and said pleated filter media, wherein said flexible collar sealingly engages a periphery of the aperture, in said metallic sheet, with which said filter is aligned.

15. The dust collector as set forth in claim 14 wherein said core member is an elongated perforated member oblong in cross section.

16. The dust collector as set forth in claim 14 wherein said flexible collar has an integral upper rim engaging a top surface of said metallic sheet and a groove for receiving said periphery of said aperture with which said filter cartridge is aligned.

17. The dust collector as set forth in claim 14, wherein each said aperture of said plurality of apertures in said metallic sheet is oblong.

18. A filter cartridge consisting essentially of:
 a non-round, elongate perforated core member having a top and a bottom;
 pleated filter media positioned about said core member, said pleated filter media having a top and a bottom;
 a non-round, molded flexible upper collar fixedly secured to said tops of said core member and said pleated filter media; and
 a bottom element secured to said bottoms of said core member and said pleated filter media.

19. A filter cartridge consisting essentially of:
 a non-round, elongate perforated core member having a top and a bottom;
 pleated filter media positioned about said core member, said pleated filter media having a top and a bottom;
 a non-round, molded flexible upper collar fixedly secured to said tops of said core member and said pleated filter media;
 a bottom element secured to said bottoms of said core member and said pleated filter media; and
 a support band positioned around said pleated filter media.

20. A filter cartridge consisting essentially of:
 a non-round, elongate perforated core member having a top and a bottom;
 pleated filter media positioned about said core member, said pleated filter media having a top and a bottom;
 a non-round, molded flexible upper collar fixedly secured to said tops of said core member and said pleated filter media;
 a bottom element secured to said bottoms of said core member and said pleated filter media; and
 a plurality of support bands positioned around said pleated filter media.

* * * * *